United States Patent [19]

Rice et al.

[11] Patent Number: 5,103,880

[45] Date of Patent: Apr. 14, 1992

[54] MACHINE FOR FORMING RAISED PANEL DOORS

[75] Inventors: Verle Rice, Harrisonville; Richard Keener, Garden City, both of Mo.

[73] Assignee: R.B. Industries, Inc., Harrisonville, Mo.

[21] Appl. No.: 722,137

[22] Filed: Jun. 27, 1991

[51] Int. Cl.⁵ .............................................. B27C 9/00
[52] U.S. Cl. ................................ 144/3 R; 144/134 R; 144/367; 409/163; 269/58
[58] Field of Search ................. 269/55, 56, 58; 409/163, 178, 182, 134, 137, 158; 144/1 R, 3 R, 367, 134 R

[56] References Cited

U.S. PATENT DOCUMENTS 1,959,241  5/1934  Kelley .......................... 409/163
3,008,501  11/1961  Hammer ....................... 144/3 R
4,655,268  4/1987  Lundblom ..................... 144/3 R Primary Examiner—W. Donald Bray
Attorney, Agent, or Firm—Shook, Hardy & Bacon

[57] ABSTRACT

A machine for shaping the panels, rails and stiles used to construct raised panel doors. A motor driven arbor shaft carries three different cutters which bevel the panel edges, groove the edges of the rails and stiles and shape the ends of the rails complementally to the grooved edges of the stiles. Adjustable fences guide the workpieces through the cutters along strips which rest on the table and are of various thicknesses to accommodate cutters of different sizes. A carriage travels in a guided manner along the fence used for the cutting of the ends of the rails and is equipped with a quick release clamp for securing the rails in position as their ends are fed through the cutter.

20 Claims, 3 Drawing Sheets

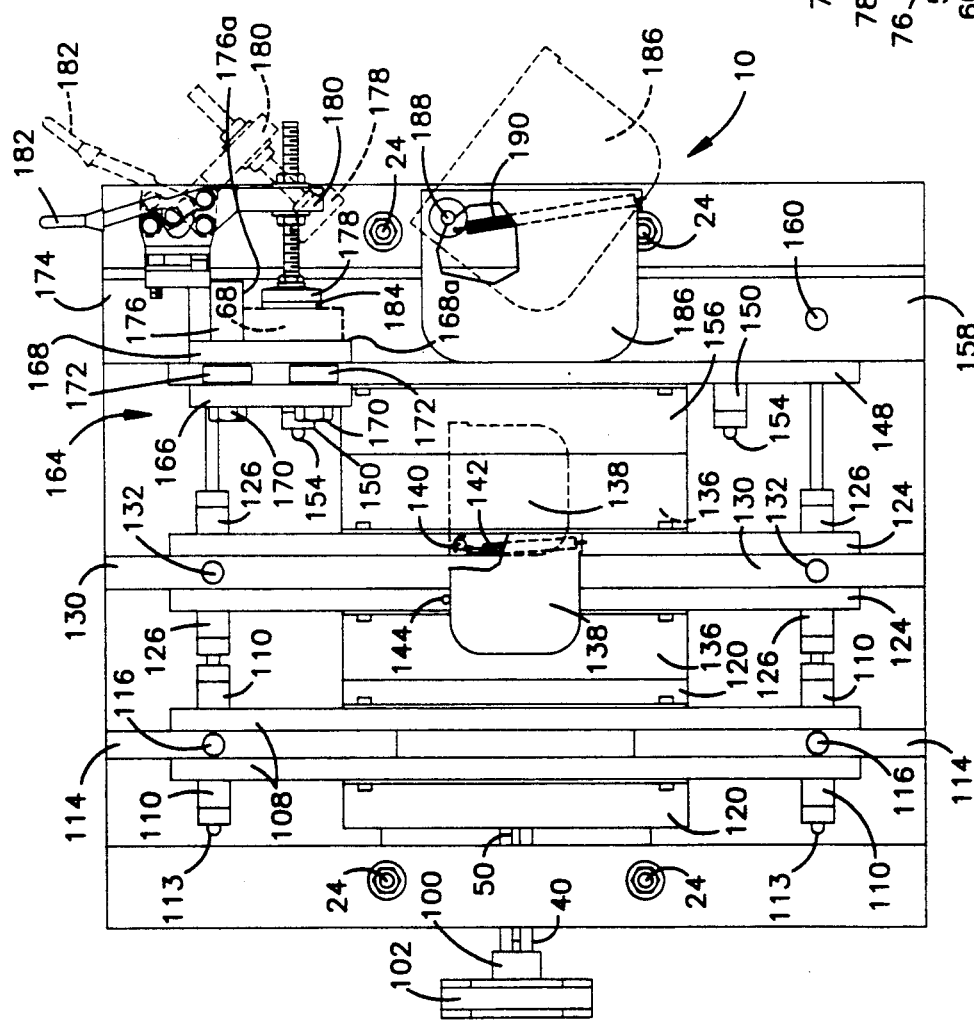

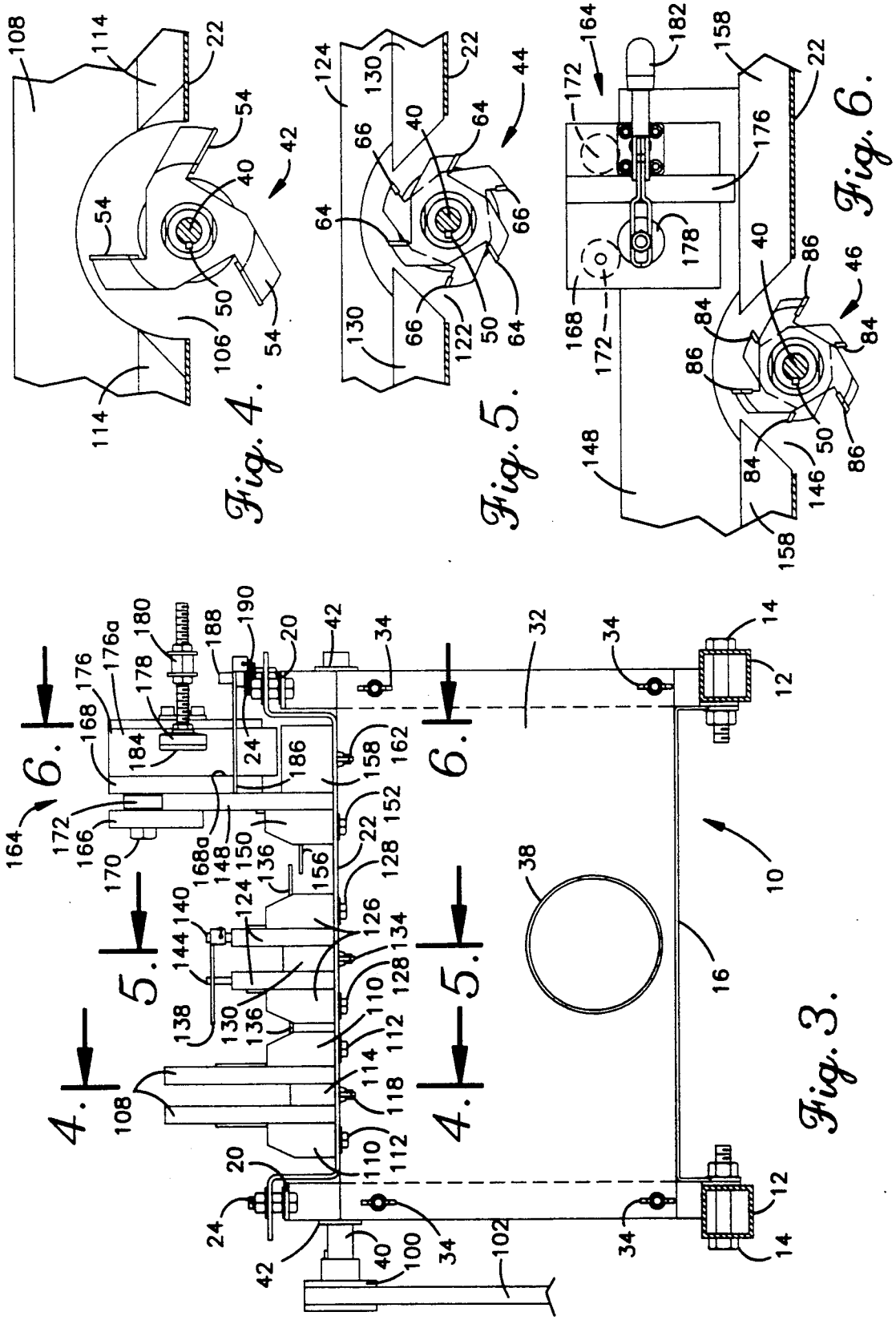

MACHINE FOR FORMING RAISED PANEL DOORS

BACKGROUND AND SUMMARY OF THE INVENTION

This invention relates generally to the field of woodworking and more particularly to a machine which is constructed to perform all of the shaping operations that are necessary to form a raised panel door.

Raised panel doors have long been popular not only for the doors of cabinets, but also for full size doors of the type that open and close doorways. In order to construct a raised panel door, it is necessary to perform a variety of woodworking operations. In the case of a cabinet door having a single panel, the panel is first cut to size and the two rails and two stiles are cut to length. Panel raiser cuts are made in the four edges of the panel to bevel them and provide the desired appearance on the periphery of the panel. The inside edges of each stile and each rail must be grooved to receive the panel edges and to shape the visible parts of the stiles and rails as desired. Finally, the ends of the rails must be shaped complementally to the grooved edges of the rails in order to mate with them when the door is assembled.

In the case of a full sized door having multiple panels, the process is even more complicated because of the number of panels. In any case, all of the cutting and shaping operations must be carried out accurately in order to make certain that the parts fit together properly and are in the correct relative positions when the door is assembled.

The present invention provides a machine on which all of the shaping operations that are required for the construction of a raised panel door may be quickly and accurately carried out. More particularly, the machine of the present invention is arranged to make the bevel cuts required to bevel the edges of the door panel, to make the cuts that are required to groove and shape the edges of the rails and stiles, and to make the cuts that are required on the ends of the rails to enable them to mate with the grooved edges of the stiles. By providing a single machine which is able to carry out all of the required operations, raised panel doors can be constructed in virtually any number much more quickly than is otherwise possible. By way of example, it has been found that approximately two minutes are all that is required to form a typical raised panel door when the machine of the present invention is used.

It is an important object of the invention to provide a machine in which the cutters for all of the cutting operations are carried on a single arbor shaft. This avoids the cost, complexity and maintenance problems that are encountered in machines which require multiple shafts and multiple drive systems for the different cutters.

Another object of the invention is to provide a machine of the character described in which the cutters are individually adjustable on the shaft in a quick and easy manner.

A further object of the invention is to provide a machine which is constructed to receive interchangeable wooden strips that vary in thickness for the components of the raised panel door to slide along as they are being fed through the cutters. Because wooden strips that vary in thickness can be accommodated interchangeably, different sizes and stiles of cutters can be accommodated without creating inaccuracies.

An additional object of the invention is to provide a machine of the character described which operates safely. The machine is characterized by retractable safety guards which protect the fingers of the operator, and by permanent covers on exposed parts of the shaft.

A still further object of the invention is to provide, in a machine of the character described, a carriage for feeding the rails such that their ends are accurately cut to mate with the grooved edges of the stiles. The carriage is guided smoothly along a guide fence on the table and is equipped with a quick release clamp which clamps the rails against work support surfaces on the carriage in order to maintain the rails vertical while their edges are being shaped by the cutter.

Yet another object of the invention is to provide a machine of the character described which may be set up quickly and easily to perform accurate shaping operations, which is equipped with guide fences that are adjustable in order to accommodate work pieces that differ in thickness, and which is constructed in a simple and economical manner.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 2 is a top plan view of the woodworking machine;

FIG. 3 is a fragmentary rear elevational view of the woodworking machine;

FIG. 4 is a fragmentary sectional view on an enlarged scale taken generally along line 4—4 of FIG. 3 in the direction of the arrows;

FIG. 5 is a fragmentary sectional view on an enlarged scale taken generally along line 5—5 of FIG. 3 in the direction of the arrows;

FIG. 6 is a fragmentary sectional view on an enlarged scale taken generally along line 6—6 of FIG. 3 in the direction of the arrows;

FIG. 8 is a fragmentary exploded view illustrating the manner in which the edges of the door panel are beveled by one of the cutters of the woodworking machine;

FIG. 9 is a fragmentary exploded view illustrating the manner in which the edges of the stiles and rails of a raised panel door are grooved and shaped by another cutter of the machine;

FIG. 10 is a fragmentary exploded view illustrating the manner in which the ends of the rails of the raised panel door are shaped by the third cutter of the machine;

FIG. 11 is a fragmentary sectional view illustrating how the edges of the panel are closely received in the grooves of the stiles and rails of the raised panel door when the door is assembled; and FIG. 12 is a fragmentary sectional view showing how the ends of the rails mate with the grooved edges of the stiles when the raised panel door is assembled.

DETAILED DESCRIPTION OF THE INVENTION

Figure 1:
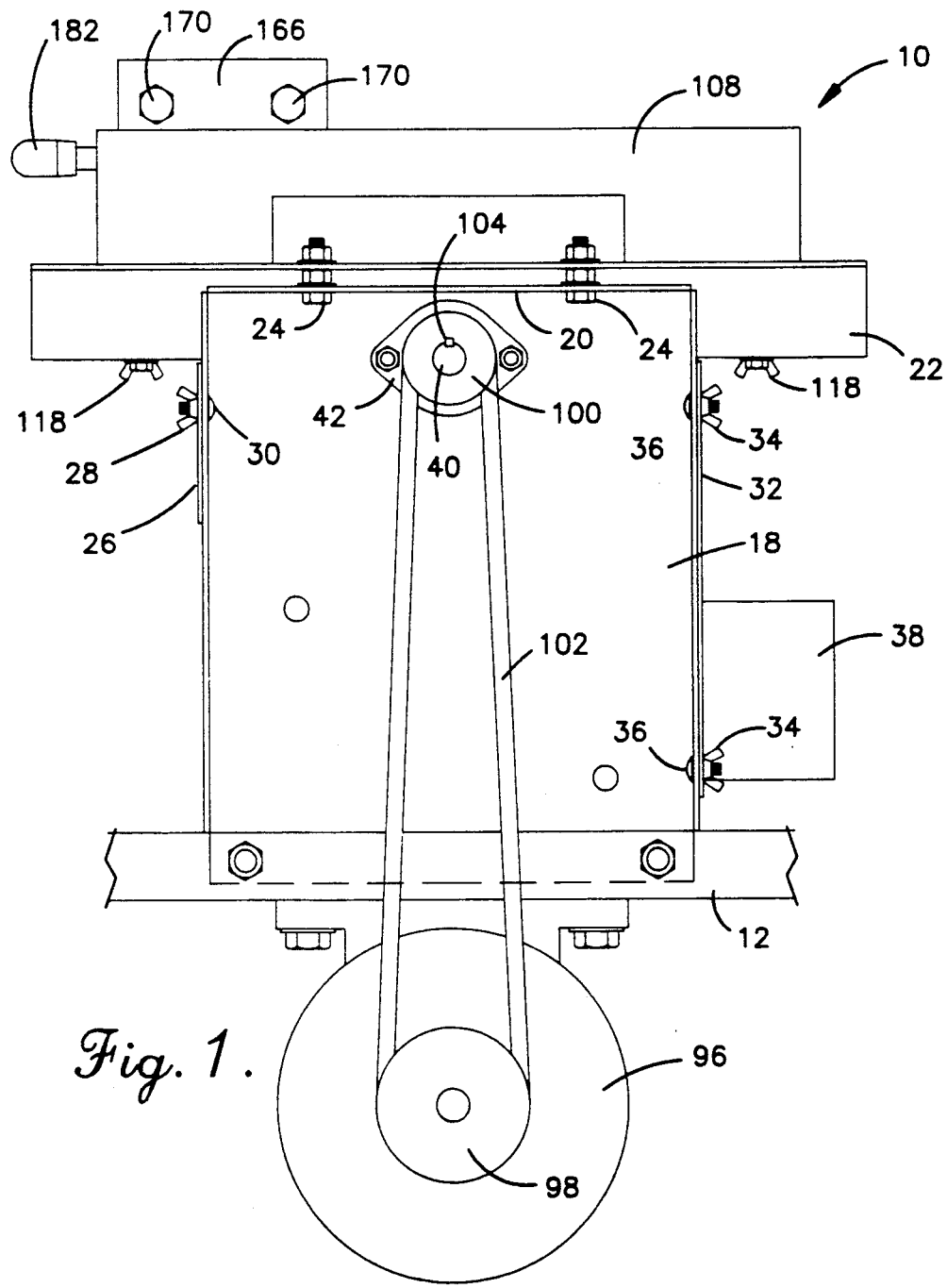
FIG. 1 is a fragmentary side elevational view of a raised panel door forming machine constructed according to a preferred embodiment of the present invention.

Referring now to the drawings in more detail, numeral 10 generally designates a machine which is constructed in accordance with the preferred embodiment of the present invention and which is used for forming raised panel doors. As best shown in FIG. 3, the machine has a rigid frame which includes a pair of square tubes 12 which may be mounted on legs (not shown) of the frame. Bolts 14 secure the flanges of a horizontal shelf 16 to the tubes 12, thus securing the shelf 16 in place. Bottom flanges of a pair of side panels 18 (see FIG. 1) are also secured to the tubes 12 by the bolts 14. The side panels 18 extend upwardly from the tubes 12 and have top flanges 20 to which the flanges of a horizontal table 22 are secured by fasteners 24 which may take the form of nuts and bolts. The table 22 is thus secured to extend between the side panels 18. Alternatively, the table 22 may be bolted directly to the base of the machine by bolting the table flanges to the base.

The area beneath the table 22 is partially covered on the back side by a removable cover panel 26 (FIG. 1) which may be secured in place by wing nuts 28 applied to bolts 30 extending from the flanges of the side panels 18. On the front side of the machine, the area beneath the table 22 is enclosed by a larger cover panel 32 which is held in place by wing nuts 34 applied to bolts 36 extending from the flanges of the side panels 18. A dust hose fitting 38 extends outwardly from the cover panel 32. A dust hose (not shown) may be applied to the fitting 38 and extended to a bin or other area intended to collect sawdust generated when the machine 10 is in operation. There are four wing nuts 34 securing the cover panel 32 in place. When these wing nuts are removed from the bolts 36, the panel 32 can be removed to provide operator access to the underside of the table 22.

Figure 7:
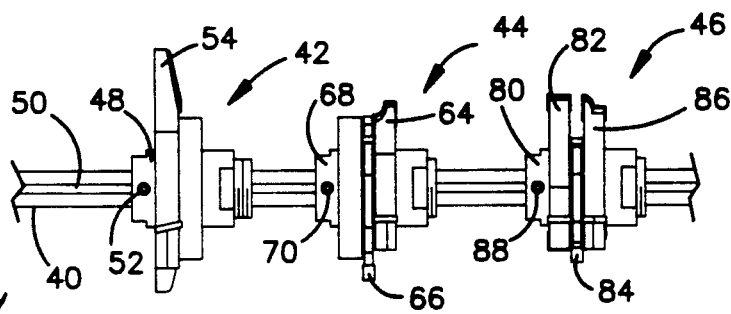
FIG. 7 is a fragmentary elevational view depicting the three sets of cutters mounted on the arbor shaft of the woodworking machine.

A horizontal arbor shaft 40 is supported for rotation by a pair of bearings 42 secured to the respective side panels 18. The shaft 40 is located at approximately the elevation of the table 22. Mounted on shaft 40 are three sets of cutters which are generally identified by numerals 42, 44 and 46 and which are depicted in FIG. 7. The holder for the first cutter 42 includes a cutter holder drum 48 having a keyway which mates with a key 50 extending from the shaft 40 along its entire length. The fit of the key 50 in the keyway causes the cutter 42 to rotate with shaft 40. A set screw 52 is threaded through the drum 48 and may be tightened against the edge of the key 50 in order to secure cutter 42 in place. The set screw 52 may be loosened in order to permit cutter 42 to be adjusted longitudinally along the length of the shaft 40.

The cutter 42 includes three cutting blades 54 which are specially shaped to provide bevel cuts on the edges of a rectangular door panel 56 (see FIG. 8). The configuration of each cutting blade 54 is such that when the cutter 42 is rotated and the door panel is fed through the rotating cutter, the edge of the panel 56 is beveled as indicated by numeral 58 in FIG. 8. Leading into the bevel 58 is a small curve 60, and the bevel terminates short of the edge of the panel to provide a relatively narrow tongue 62 on the edge of the panel.

Referring again to FIG. 7 in particular, the second cutter 44 includes two sets of cutting blades 64 and 66 carried on a holder 67 having a keyway that mates with the key 50. A set screw 67a is threaded into the holder 67 and may be tightened against the key 50 in order to secure cutter 44 in place. Set screw 67a may be loosened to permit the cutter 44 to be adjusted longitudinally on the shaft 40 before the set screw is again tightened to secure the cutter in place.

As illustrated in FIGS. 9-12, the raised panel door includes two rails 68 and two stiles 70 which are specially shaped by the blades 64 and 66. Referring particularly to FIGS. 9 and 11, blade 66 is arranged to cut a rectangular groove 72 in one edge of each rail 68 and each stile 70, and to leave a rectangular finger 74 on one side of the groove 72. On the other side of the groove 72, the other blade 64 is shaped to form a curved surface 76 and a flat 78 located adjacent to the curve 76. As best shown in FIG. 11, the groove 74 has a size to snugly receive the tongue 62 on the edge of panel 56.

As shown in FIG. 7, the third cutter 46 includes a holder 80 which carries three cutting blades 82, 84 and 86. The holder 80 has a keyway that receives the key 50 in order to mount cutter 46 on shaft 40 for rotation with the shaft. The cutter 46 may be adjusted along the length of shaft 40 by loosening a set screw 88 to permit holder 80 to slide on the shaft prior to retightening of the set screw to secure the cutter in place on the shaft.

As best shown in FIG. 10, the cutting blades 82, 84 and 86 are shaped to cut both ends of rails 68 in a shape complemental to the grooved edges of the stiles 70. Cutter 84 is recessed and located between the other two cutters 82 and 86 such that a projecting tongue 89 is formed on the end of rail 68, with cutter 86 forming a flat 90 on one side of the tongue 89. On the other side of the tongue, a curved recess 92 is formed by cutter 82, along with a lip 94 adjacent to the groove 92. As shown in FIG. 12, the tongue 89 may be fitted closely in groove 72 of the stile 70, with the curved surface 76 fitting closely in groove 92, finger 74 butting against the flat 90, and lip 94 butting against the flat 78.

It should be noted that the machine may be equipped with cutters having different styles or configurations.

The shaft 40 is driven by electric motor 96 (see FIG. 1). The output shaft of motor 96 drives a pulley 98 which drives another pulley 100 through a drive belt 102 which is drawn around the two pulleys. A key 104 connects pulley 100 with shaft 40 in order to drive the shaft whenever the motor 96 is activated. The pulleys 98 and 100 and belt 102 are normally enclosed within a safety cover (not shown).

As shown in FIG. 4, the table 22 is provided with a slot 106 through which the cutting blades 54 extend. A pair of parallel guide fences 108 (see FIGS. 2 and 3) are mounted on top of the table 22 and are spaced apart from one another in extension perpendicular to the shaft 40. A pair of blocks 110 are connected with each fence 108. Bolts 112 extend through slots 113 in the table 22 and are threaded into the blocks 110 in order to secure each of the fences 108 in place on the table. The slots 113 which receive the bolts 112 extend perpendicular to the fences 108 so that the two fences can be adjusted toward and away from one another in order to accommodate panels 56 which differ in thickness. When the fences 108 are in proper position to closely receive the panel between them, the bolts 112 are tightened in order to rigidly secure the fences in place.

The panel 56 is guided through the cutting blades 54 along a pair of wooden strips 114 which are located on opposite sides of the slot 106 (see FIG. 4). Bolts 116 (see FIG. 2) extend downwardly through the strips 114 (with the heads of the bolts recessed), and the bolts 116 receive wing nuts 118 (FIG. 3) which are tightened against the underside of the table 22 to secure the strips 114 in place between the fences 108. Shields 120 are secured to the sides of the fences 108 in order to cover the parts of the shaft 40 that would otherwise be exposed adjacent to the cutter 42.

The second cutter 44 likewise extends through a slot 122 (FIG. 5) formed through the table 22. A pair of parallel guide fences 124 are secured on the table 22 in order to guide the rails 68 and stiles 70 through the cutter 44. Each fence 124 is provided with a pair of blocks 126 which receive bolts 128 threaded upwardly into the blocks from the underside of table 22. The bolts 128 extend through the slots 113 in the table 22, and the fences 124 can thus be adjusted toward and away from one another to accommodate rails and stiles that differ in thickness. When the bolts 128 are tightened, the fences 124 are secured rigidly in place.

Secured on table 22 between the fences 124 are a pair of wooden strips 130 along which the rails and stiles slide as they are fed through the cutter 44. Bolts 132 extend through the strips 130 and receive wing nuts 134 (see FIG. 3) which are tightened against the underside of table 22 in order to secure the strips 130 in place between the fences 124 and on opposite sides of the slot 122. Shields 136 are secured to the fences 124 and cover the parts of the shaft 40 that would otherwise be exposed adjacent to the cutter 44.

A retractable safety guard 138 is pivotally mounted on a stud 140 extending upwardly from one of the fences 124. A tension spring 142 acts on the guard 138 and normally urges it to the solid line position of FIG. 2 in which the guard 138 covers the underlying cutter 44 and is engaged against a stop 144. The guard 138 may be pivoted about stud 140 to the retracted position shown in broken lines in FIG. 2, and this stretches the tension spring 142 such that the guard is returned immediately to the solid line position of FIG. 2 as soon as the force which displaced it is removed.

The third cutter 46 extends through a slot 146 (see FIG. 6) which is formed in the table 22. A guide fence 148 is secured on the table 22 at a location to one side of the cutter 46. A pair of blocks 150 are connected with the fence 148 and receive bolts 152 which are threaded into the blocks through slots 154 formed in the table 22. The slots 154 are perpendicular to the fence 148 to permit the fence to be adjusted toward and away from the cutter 46. A shield 156 projects from the fence 148 and partially underlies shield 136 in order to shield the adjacent part of the shaft 40 that would otherwise be exposed.

A pair of wooden strips 158 are secured on top of the table 22 at locations adjacent to the fence 148 on opposite sides of the slot 146. Bolts 160 extend through the strips 158 and receive wing nuts 162 on their lower ends which may be tightened against the underside of table 22 in order to secure the strips in place. The strips 158 provide a guide surface along which the ends of the rails 68 slide while the rails are being fed through the cutter 46. The strips 158 may be replaced by a one piece aluminum strip or any other suitable strip.

Feeding of the rails 68 through cutter 46 is effected by a carriage which is generally identified by numeral 164 and which includes a pair of plates 166 and 168 connected by a pair of axle bolts 170 which carry roller bearings 172 between the two plates 166 and 168. As best shown in FIGS. 2 and 3, the plates 166 and 168 are spaced apart to closely confront the opposite sides of the fence 148 when the roller bearings 172 are applied to the upper edge of the fence. The roller bearings 172 are mounted for rotation on the axle bolts 170 and may be rolled along the upper edge of fence 148 in order to guide the carriage 164 along the fence.

A nylon slide bar (not shown) may be used in place of the roller bearings 172. The slide bar may be suitably secured between the plates 166 and 168 to ride along the top edge of fence 48 smoothly for guiding of the carriage 164. The slide bar performs the same function as the roller bearings.

The carriage 164 includes a mounting block 174 and a wooden backer block 176 having a work supporting face 176a which is adjacent to and perpendicular to a work supporting surface 168a on plate 168. The carriage 164 also includes a quick release clamp mechanism having a clamp 178 carried on a threaded rod which is threaded through an arm 180. A handle 182 has a knuckle joint connection with the arm 180 such that when the handle 182 is moved to the position shown in solid lines in FIG. 2, the arm 182 is locked in place to secure clamp 178 against the rail 68 in order to hold the side of the rail against surface 168a and the edge of the rail against surface 176a, preferably, the face of clamp 178 carries a rubber foot 184 which contacts the rail 68 in a manner to avoid scratching or otherwise marring the rail. When the handle 182 is pivoted to the broken line position of FIG. 2, the arm 180 is pivoted away from plate 168 in order to release the clamp 178 to the broken line position of FIG. 2.

A safety guard 186 is pivotally mounted on a stud 188 secured on one of the flanges of the table 22. A tension spring 190 acts on the safety guard 186 to normally maintain it in the solid line position shown in FIG. 2, in which the safety guard covers the underlying cutter 46 with the edge of the safety guard stopped by engagement with the side of the fence 148. The safety guard 186 may be pivotally displaced about bolt 188 to the broken line position of FIG. 2 when the rail is fed through the cutter. Immediately after the rail has cleared the safety guard, the tension of the spring 190 returns the safety guard to the solid line position of FIG. 2.

In operation of the machine, all of the fences are adjusted to the thickness of the components of the raised panel door. Also, each of the cutters 42, 44 and 46 is adjusted lengthwise on the shaft 40 to the proper position. Then, the motor 96 may be turned on by a suitable on-off switch (not shown) in order to rotate the shaft 40 and all of the cutters it carries.

The panel 56 may be inserted between the two fences 108 with one edge on the strips 114. As the panel is fed along the strips 114, the cutter 42 cuts the bevel 58, the small curve 160 and the tongue 62 along the entire panel edge. The remaining three edges of the panel are cut in the same manner until all four of the edges have been beveled.

Next, one edge of each rail 68 and each stile 70 is fed along strips 130 through the cutter 44 with the rail or stile fitting closely between the two fences 124 to assure an accurate cut. The cutter 44 forms in the edge of each rail and each stile the grooved configuration shown in FIG. 9.

The final operation involves feeding each of the rails 68 through cutter 48 in order to cut both of the ends of both rails. The rail is fitted against the support surfaces 168a and 176a, and the clamp mechanism may then be closed in order to rigidly secure the rail 56 in place on carriage 164 such that the rail is held in a vertical orientation with its lower edge on the underlying strip 158. The carriage may then be rolled along fence 148 (or slid along the fence if a nylon side bar is provided), and the cutter 46 cuts the end of the rail in the configuration shown in FIG. 10. After the rail has been passed through the cutter 46, the clamp mechanism may be released and the rail may be removed from the carriage and inverted to cut its other end. After both ends of both rails 68 have been cut in this manner, the raised panel door can be assembled.

To assemble the door, the stiles 70 are applied to the side edges of panel 56 with the tongues 62 fitting closely in the grooves 74 as shown in FIG. 10. Then, the rails 68 are applied to the top and bottom edges of panel 56, again with the tongues 62 fitting in the grooves 72 and also with the ends of the rails mating with the grooved edges of the stiles in the manner shown in FIG. 12. Once a good fit has been assured, the components can be glued in place to secure the raised panel door in the assembled condition.

It is noted that the strips 114, 130 and 158 can be replaced with interchangeable strips which differ in thickness so that different sizes and stiles of cutters can be used on the machine while still carrying out the necessary cutting and shaping operations in an accurate manner. Additionally, the fences can be adjusted to accommodate different thicknesses, and the clamp 178 can likewise be adjusted to accommodate differing thicknesses by threading its rod into or out of the arm 180.

The cover panel 32 can be removed to provide access to the cutters 42, 44 and 46 for adjustment of their positions on the shaft 40. When the machine is in operation, the cover panel 32 is reinstalled for safety reasons and to provide for attachment of a dust hose to the dust hose fitting 38.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. Apparatus for cutting parts of a raised panel door which includes a pair of rails each having an edge and opposite ends, a pair of stiles each having an edge, and a generally rectangular panel having plural edges, said apparatus comprising:
   a frame presenting a generally horizontal table having first, second and third cutter openings therein;
   a generally horizontal shaft mounted on the frame for axial rotation and extending adjacent each of said cutter openings;
   power means for rotating said shaft;
   a first cutter mounted on said shaft for rotation therewith at a location adjacent said first cutter opening, said first cutter having a configuration to cut a bevel on each edge of said panel;
   adjustable fence means on the table for guiding said panel through said first cutter in a manner to maintain the panel in a substantially vertical plane;
   a second cutter mounted on said shaft for rotation therewith at a location adjacent said second cutter opening, said second cutter having a configuration to cut a groove in the edges of the rails and stiles in a preselected configuration to receive the beveled edges of the panel;
   adjustable fence means on the table for guiding said rails and stiles through the second cutter to cut said grooves;
   a third cutter mounted on said shaft for rotation therewith at a location adjacent said third cutter opening, said third cutter having a configuration to cut on the ends of said rails a tongue having a configuration complemental to said preselected configuration; and
   adjustable fence means on the table for guiding each rail through the third cutter while maintaining each rail in a substantially vertical orientation.

2. Apparatus as set forth in claim 1, wherein said fence means for guiding said panel includes a pair of guide fences arranged parallel to one another on the table for receiving the panel closely therebetween to guide the panel through said first cutter, said guide fences being adjustable toward and away from one another to accommodate panels which vary in thickness.

3. Apparatus as set forth in claim 2, including means for securing strips having different thicknesses on the table between said fences on opposite sides of the first cutter opening for the edges of the panel to slide along through the first cutter.

4. Apparatus as set forth in claim 1, wherein said fence means for guiding said rails and stiles includes a pair of fences arranged parallel to one another on the table for receiving the rails and stiles closely therebetween during movement through the second cutter, said fences being adjustable toward and away from one another to accommodate rails and stiles which vary in thickness.

5. Apparatus as set forth in claim 4, including a safety guard on one of the fences overlying the second cutter.

6. Apparatus as set forth in claim 4, including means for securing strips having different thicknesses on the table between said fences on opposite sides of said second cutter opening for the edges of the rails and stiles to slide along through the second cutter.

7. Apparatus as set forth in claim 1, including a carriage for feeding said rails through the third cutter, said carriage traveling along said fence means for guiding each rail and including releasable clamp means for securing each rail to the carriage in a vertical orientation.

8. Apparatus as set forth in claim 7, wherein:
   said fence means for guiding each rail comprises a fence extending upwardly from the table; and
   said carriage includes means for guiding the carriage along said fence.

9. Apparatus as set forth in claim 8, wherein:
   said carriage includes a pair of plates connected to one another and confronting opposite side of said fence; and
   said guiding means includes low friction means located between said plates and traveling along an upper edge of said fence to guide said carriage along the fence.

10. Apparatus as set forth in claim 7, wherein said clamp means comprises a clamp element mounted on said carriage for movement between a clamped position for clamping a rail to the carriage and a release position for releasing the rail from the carriage.

11. Apparatus as set forth in claim 8, including means for securing strips having different thicknesses on the table adjacent said fence on opposite sides of said third cutter opening for the ends of the rails to slide along through the third cutter.

12. Apparatus as set forth in claim 1, including a retractable safety guard biased toward a position overlying said third cutter, said safety guard being displaced from said position during movement of a rail through the third cutter and returning to said position after the rail has passed through the third cutter.

13. Apparatus as set forth in claim 1, including means for adjusting each cutter axially along said shaft.

14. Apparatus for cutting parts of a raised panel door which includes a pair of rails each having an edge and opposite ends, a pair of stiles each having an edge, and a generally rectangular panel having plural edges, said apparatus comprising:
 a frame presenting a generally horizontal table;
 a generally horizontal shaft mounted on the frame for axial rotation and extending adjacent the table, said shaft carrying a first cutter for beveling the edges of the panel, a second cutter for grooving the edges of the rails and stiles for receipt of the beveled panel edges, and a third cutter for cutting the ends of the rails complementally to the grooved edges of the stiles;
 power means for rotating said shaft;
 means for securing strips of different thicknesses to the table for the panel, rails and stiles to slide along during passage through the cutters;
 a first pair of parallel fences on the table for closely receiving the panel therebetween to guide the panel through the first cutter while maintaining the panel in a vertical orientation;
 a second pair of parallel fences on the table for closely receiving the rails and stiles through the second cutter to cut grooves in said edges thereof; and
 a guide fence on the table for guiding of the rails through the third cutter for cutting the ends thereof complementally to the groove edges of the stiles.

15. Apparatus as set forth in claim 14, including means for adjusting each cutter axially along said shaft.

16. Apparatus as set forth in claim 14, including a carriage applicable to said guide fence for movement thereon and having releasable clamp means for clamping each rail to the carriage in a vertical orientation.

17. Apparatus as set forth in claim 16, wherein said carriage includes means for guiding the carriage along an upper edge of said guide fence.

18. Apparatus as set forth in claim 17, wherein said carriage includes a pair of plates between which said guiding means is disposed, said plates being held against opposite sides of said guide fence when said guiding means travels along the upper edge thereof.

19. In a woodworking machine having a table and a power driven cutter for shaping the end of a wooden workpiece fed therethrough, the improvement comprising:
 an adjustable fence on the table providing a guide for feeding the workpiece through the cutter, said fence having opposite sides and an upper edge;
 a carriage for travel along said fence, said carriage including a pair of plates and guide means between said plates acting to position said plates adjacent the opposite sides of said fence when said guide means travels along said upper edge thereof; and
 releaseable clamp means for clamping the workpiece to said carriage at a preselected location wherein the workpiece is held in a vertical orientation to feed a lower end thereof through the cutter when said guide means is rolled along the upper edge of said fence.

20. The improvement of claim 19, wherein:
 said carriage includes a block having a work support surface extending perpendicular to a work support surface of one of said plates; and
 said clamp means is operable to clamp the workpiece with a side thereof against said work support surface of said one plate and an edge thereof against said work support surface of said carriage.

* * * * *